United States Patent [19]

Obara

[11] 4,431,895
[45] Feb. 14, 1984

[54] POWER SOURCE ARRANGEMENT FOR ELECTRIC DISCHARGE MACHINING

[75] Inventor: Haruki Obara, Sagamihara, Japan
[73] Assignee: Fujitsu Fanuc Limited, Tokyo, Japan
[21] Appl. No.: 252,215
[22] Filed: Apr. 8, 1981
[30] Foreign Application Priority Data Apr. 16, 1980 [JP] Japan .................................. 55-49942

[51] Int. Cl.$^3$ .............................................. B23P 1/08
[52] U.S. Cl. .............................. 219/69 P; 219/69 G; 219/69 S
[58] Field of Search ............... 219/69 M, 69 C, 69 G, 219/69 P, 69 S, 69 R, 68

[56] References Cited

U.S. PATENT DOCUMENTS

| | | | |
|---|---|---|---|
| 3,614,368 | 10/1971 | Lobur | 219/69 C |
| 3,697,719 | 10/1972 | Verner et al. | 219/69 P |
| 4,071,729 | 1/1978 | Bell, Jr. | 219/69 P |
| 4,292,490 | 9/1981 | Bell, Jr. et al. | 219/69 P |

*Primary Examiner*—M. H. Paschall
*Attorney, Agent, or Firm*—Staas & Halsey

[57] ABSTRACT

A power source arrangement for electric discharge machining in which a power source and a switching element are connected in parallel to an electrode and a workpiece and the switching element is driven by a pulse signal of a predetermined period to perform electric discharge machining of the workpiece, there being also provided a pulse signal generator for generating a pulse signal in which the ratio of the OFF interval to the ON interval gradually increases with the lapse of time and a detector for detecting the occurrence of an arc or short in the spark gap. Upon detection of arcing or shorting in the spark gap by the detector, the pulse signal generator is activated so that the pulse signal of the predetermined period to be applied to the switching element is gated by the output pulse signal from the pulse signal generator until the arc or short is removed.

4 Claims, 12 Drawing Figures

FIG. IA
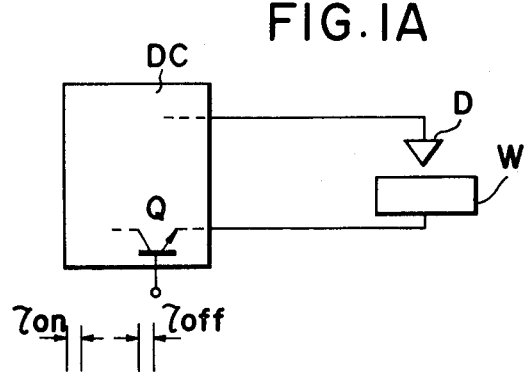
FIG. IB
FIG. IC
FIG. 2
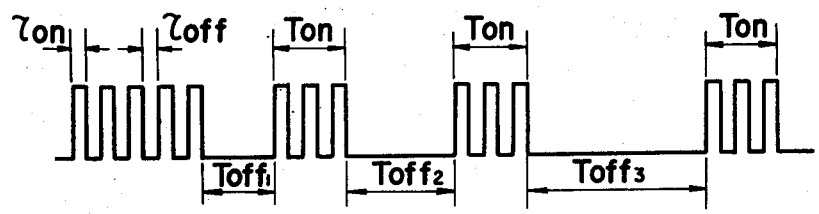
FIG. 3
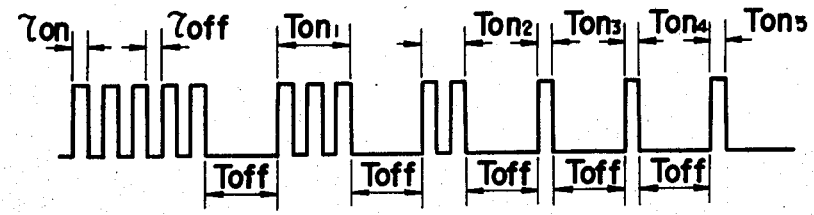
FIG. 4
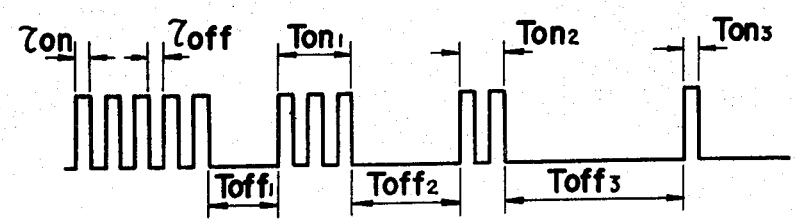

POWER SOURCE ARRANGEMENT FOR ELECTRIC DISCHARGE MACHINING

BACKGROUND OF THE INVENTION

1. Field of the Invention

The present invention relates to a power source arrangement for electric discharge machining by applying a voltage across an electrode and a workpiece.

2. Description of the Prior Art

When a workpiece is machined by applying a pulse voltage to a spark gap defined between an electrode and the workpiece, it is very likely that, during the machining, an arc will form in the spark gap or that cutting chips will accumulate in the gap to cause a short between the electrode and the workpiece. The generation of such an arc or short decreases the cutting efficiency in proportion to the duration of its existence and is liable to deteriorate the surface finish of the work. Especially, arcing or shorting of long duration markedly impairs the cutting efficiency and causes burning of the workpiece and, in the case of wire-cut, electric discharge machining, breakage of the wire. Accordingly, it is necessary to remove such arcing or shorting as soon as possible if it occurs during cutting.

To this end, the prior art employs a method wherein the OFF period of a power source DC for applying a voltage across an electrode D and a workpiece W, as shown in FIG. 1A, is extended for a certain period of time in the case of arcing or shorting. That is, during normal operation a switching element Q for turning the power source DC on and off is driven by a pulse signal of a predetermined period which has an ON time $T_{on}$ and an OFF time $T_{off}$, such as shown in FIG. 1B, but in the case of arcing or shorting having once occurred, the switching element Q is driven by such a pulse signal as depicted in FIG. 1C which has long OFF and ON intervals Toff and Ton, thereby to quickly restore the insulation of the spark gap.

With the above conventional method, however, the ON and OFF intervals Ton and Toff are set at mean values obtained experimentally; therefore, an arc of high intensity cannot be removed in one OFF interval Toff. If the arcing is not removed in one OFF interval, then an arc discharge is produced in the immediately subsequent ON interval Ton in many cases, which degrades the insulation of the spark gap and makes it difficult to completely restore the insulation of the gap in the subsequent OFF interval Toff. For such reasons, the prior art has encountered difficulty in early removal of a high intensity arc and has suffered from burning of the workpiece and reduction of the cutting efficiency by arcing of long duration.

SUMMARY OF THE INVENTION

It is an object of the present invention to provide a power source arrangement for electric discharge machining which is designed so that the ON and OFF intervals are varied with the duration of an arc or short in the spark gap, in order to permit an early removal of an arc or short regardless of its intensity, thereby providing for enhanced overall cutting efficiency. Briefly stated, according to the present invention, in a power source arrangement for electric discharge machining in which a power source and a switching element are connected in parallel to an electrode and a workpiece and the switching element is driven by a pulse signal of a predetermined period to perform electric discharge machining of the workpiece, there are provided a pulse signal generator for generating a pulse signal having an OFF to ON interval ratio which increases with the lapse of time, and a detector for detecting the occurrence of an arc or short in the spark gap. Upon detection of arcing or shorting in the spark gap by the detector, the pulse signal generator is activated so that the pulse signal of predetermined period, which is to be applied to the switching element, is gated by the output pulse signal from the pulse signal generator until the arc or short is removed.

BRIEF DESCRIPTION OF THE DRAWINGS

FIGS. 1A, 1B and 1C explanatory of a conventional method for the removal of an arc or short in the spark gap;

FIGS. 2 to 4 are explanatory of embodiments of the present invention;

DESCRIPTION OF THE PREFERRED EMBODIMENTS

Figure 5:
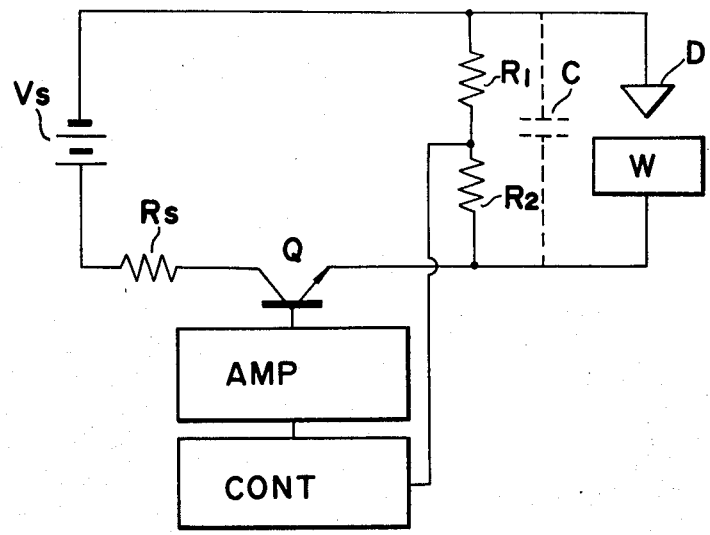
FIG. 5 is an electric circuit diagram illustrating an example of the power source arrangement for electric discharge machining according to the present invention.

FIG. 2 is explanatory of an embodiment of the present invention, showing a pulse signal which is applied to a switching element of the power source for electric discharge machining. In this embodiment, the signal such as shown in FIG. 2, in which the ON interval Ton is constant but the OFF interval Toff increases with the lapse of time, is applied to the switching element of the power source until arcing or shorting ceases. With such an arrangement, an arc of high intensity which is not removed in a first OFF interval $Toff_1$ can be removed in the longer second or third OFF intervals $Toff_2$ or $Toff_3$, preventing arcing or shorting from lasting for a long time.

It might be thought that a gradual increase in the OFF intervals Toff would decrease the average cutting speed as compared with the prior art, but by increasing the OFF intervals in accordance with the intensity of the arc, the peak value $I_p$ of the working current can be increased. Accordingly, therefore, the cutting speed does not become lower than in the prior art. Conversely the cutting efficiency is improved by an earlier removal of the high intensity arc.

The length of the first OFF interval $Toff_1$ may be set to a value substantially equal to the OFF interval Toff in the prior art example of FIG. 1, but it is preferable to set the OFF interval $Toff_1$ to a smaller value, taking into account the facts that many arcs which form during cutting disappear in a very short OFF interval and that the OFF interval $Toff_1$ is followed by longer ones, unlike in the prior art.

FIG. 3 schematically shows a pulse signal for driving the power source for electric discharge machining in accordance with another embodiment of the present invention. In this embodiment, when arcing or shorting occur a pulse signal as depicted in FIG. 3, in which the OFF interval Toff is fixed and the ON intervals Ton decrease with the lapse of time, iis applied to the switching element of the power source until the arc or short disappears. With such an arrangement, if the insulation of the spark gap is not sufficiently restored in the first OFF interval Toff, the insulation of the gap in the subsequent ON interval Ton is less degraded than in the prior art; that is, there can equivalently be produced the same effect as that obtainable by extending the OFF interval Toff, in consequence of which a high intensity arc can be quickly removed. In this case, the cutting speed becomes higher than in the prior art partly because the reduction of the ON interval Ton decreases the wasteful arc discharge during a high intensity arc and partly because the arc is removed early.

The reason for not reducing the first ON interval is to apply a current across the electrode and the workpiece to some extent, whereby cutting chips which might have accumulated in the spark gap to cause arcing or shorting between the electrode and the workpiece are blown off. If arcing or shorting has not been removed after several relatively long ON intervals it is better, of course, to reduce the ON intervals and await restoration of the insulation by spontaneous vibrations of the electrode or pressure fluctuations in the dielectric fluid. The reason is that if the application of the working current should be continued, the arcing or shorting portions would be overheated and generate quantities of ions or bubbles, exerting adverse influence on the subsequent machining. Accordingly, the ON intervals are reduced with time in this embodiment. The ON intervals can be reduced to a minimum of one pulse which is necessary for the detection of an arc or short.

FIG. 4 illustrates a pulse signal for driving the power source for electric discharge machining in accordance with another embodiment of the present invention, which is a combination of the two embodiments described above. That is, when an arc or short occurs, a pulse signal such as depicted in FIG. 4, in which the OFF intervals Toff increase with the lapse of time and the ON intervals Ton decrease with the lapse of time, is applied to the switching element of the power source until the arc or short is removed. Such an arrangement permits an earlier removal of a higher intensity arc than the above-described embodiments and, consequently, the cutting efficiency is also raised.

FIG. 5 is an electric circuit diagram showing an example of the power source arrangement for electric discharge machining according to the present invention. In FIG. 5, reference character D indicates an electrode; W designates a workpiece; $V_S$ identifies a DC high-tension power source; $R_S$ denotes a charging resistor; Q represents a switching element such as, for example, a transistor; $R_1$ and $R_2$ refer to voltage dividing resistors; C refers to a capacitor; CONT indicates a control circuit; and AMP designates a pre-amplifier. In the absence of the capacitor C, there is formed what is called an independent discharge circuit and, by connecting the capacitor C as depicted, a slave discharge circuit is formed.

The control circuit CONT generates a pulse signal of a predetermined period which has an ON time $\tau_{on}$ and an OFF time $\tau_{off}$. The spark gap voltage is detected by the resistors $R_1$ and $R_2$ and, when the occurrence of arcing or shorting is detected, the control circuit CONT adds to the aforesaid pulse signal ON and OFF intervals as shown in FIGS. 2 to 4 and applies them via the pre-amplifier AMP to the base of the transistor Q.

Figure 6:
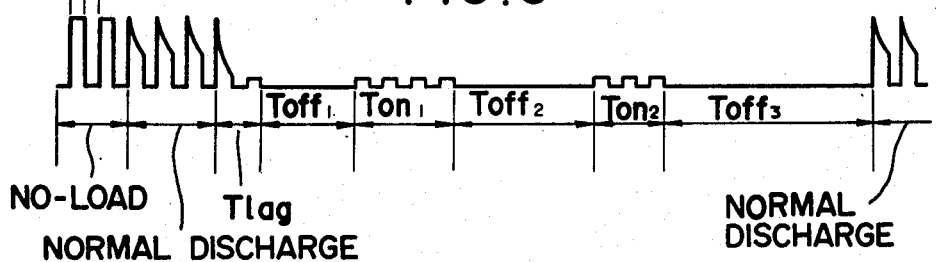
FIGS. 6, 7A and 7B are explanatory of the operation of the circuit depicted in FIG. 5.

FIG. 6 shows variations in the spark gap voltage $V_G$ with time when the circuit of FIG. 5 is operated as an independent discharge circuit. As shown in FIG. 6, during normal discharge, a discharge or a no-load state is repeated, the ON time being $\tau_{on}$ and the OFF time being $\tau_{off}$. When an arc or short has formed in the spark gap, the first interval Toff$_1$ is inserted after a certain period of time Tlag. The switching operation is performed again for the ON interval Ton$_1$ alone and the control circuit CONT checks whether or not the arc or short has been removed in this interval. In the illustrated example, since the spark gap insulation has not been restored in this interval, the second OFF interval Toff$_2$ is inserted and, in the interval ON interval Ton$_2$, whether or not the arc or short has been removed is again checked. Such operations are repeated until the spark gap insulation is restored. FIG. 6 shows the case where the normal discharge is restored after the third OFF interval Toff$_3$.

Figure 7A:
Figure 7B:
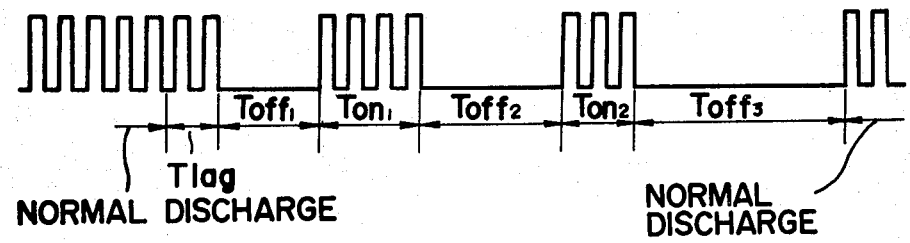

When the circuit of FIG. 5 is operated as a slave discharge circuit, the spark gap voltage $V_G$ undergoes, with the lapse of time, variations such as depicted in FIG. 7A. The operation of the switching element Q in this case is such as shown in FIG. 7B. The occurrence of arcing or shorting in the spark gap is checked by comparing a reference voltage Vl and the spark gap voltage $V_G$ in the period Tlag. The reason the OFF interval Toff is inserted a certain period of time Tlag after the detection of arcing or shorting, instead of immediately thereafter, is to prevent the cutting efficiency from being impared by inserting the OFF interval in response to an arc discharge which occurs instantly. This time lag Tlag is required especially for finish machining or wire-cut, electric discharge machining through the use of the slave discharge circuit.

Figure 8:
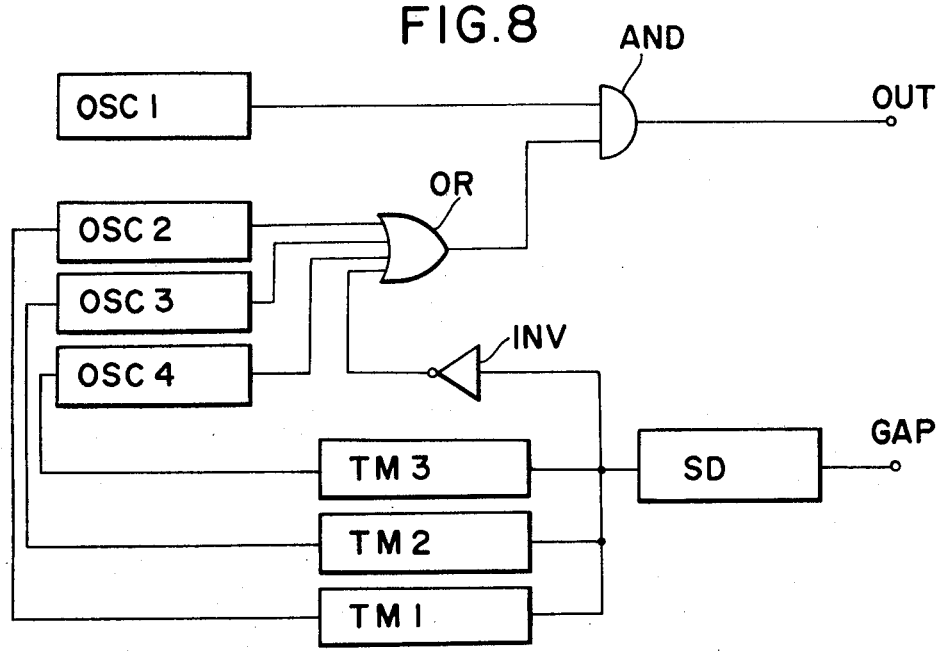
FIG. 8 is a block diagram illustrating an example of the control circuit used in FIG. 5.
Figure 9:
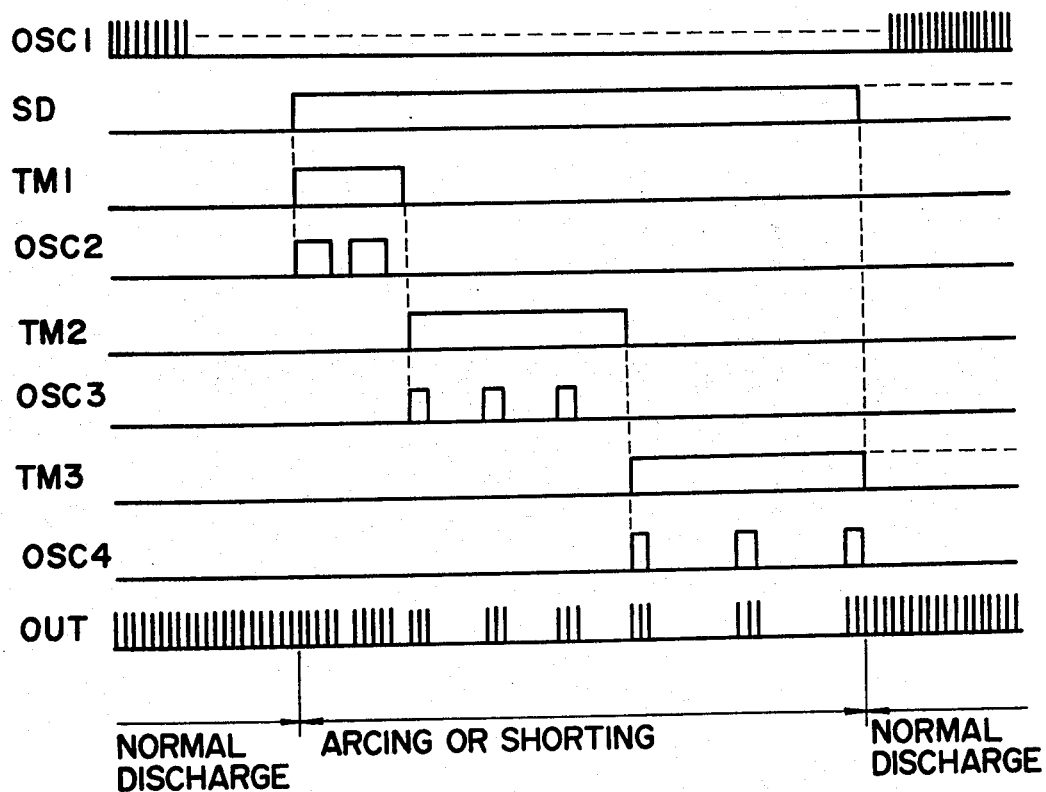
FIG. 9 shows signal waveforms appearing at respective parts of the circuit of FIG. 8 during the operation thereof.

FIG. 8 is a block diagram illustrating an example of the control circuit CONT which is designed for changing both of the ON intervals and the OFF intervals. In FIG. 8, reference OSC1 to OSC4 indicate oscillators; SD designates a short detector circuit; TM1 to TM3 identify timers; INV denotes an inverter; OR represents an OR circuit; AND shows an AND circuit; OUT refers to an output terminal; and GAP indicates an input terminal. FIG. 9 shows signal waveforms occurring in respective parts of the circuit of FIG. 8 during the operation thereof.

In FIG. 8, a spark gap voltage signal is applied via the input terminal GAP to the short detector circuit SD, which detects an arc or short in the spark gap and yields "1" in the case of arcing or shorting and "0" in the case of normal discharge. The short detector circuit SD is formed using a one of the known circuit arrangements.

The oscillator SC1 is to supply the AND circuit AND with the pulse signal of a predetermined period which has the ON time $\tau_{on}$ and the OFF time $\tau_{off}$. During normal operation, since the AND circuit AND is opened by the output from the inverter INV, the output pulse signal from the oscillator OSC1 is applied in the output terminal OUT to the pre-amplifier AMP shown in FIG. 5. The period of the oscillator OSC1 is usually variable from the outside.

Each of the timers TM1 to TM3 is one that, when supplied with the output signal "1" from the short detector circuit SD, generates pulses for a certain period of time after a certain time lag. These timers apply pulses such as shown to the oscillators OSC1 to OSC4 in a sequential order TM1-TM2-TM3. The outputs from the timers TM1 to TM3 become all "0" when the output from the short detector circuit SD has become "0". The timer TM3 maintains its output at "1" until the short detector circuit SD provides the output "0". Such operations can be performed using analog or digital IC's now on the market.

The oscillators OSC2 to OSC4 start oscillating upon application of an input signal "1" and continue oscillating while the input signal is "1". These oscillators are set so that the ON time of their output pulses decreases in the order OSC2-OSC3-OSC4 and so that the OFF time increases in the opposite order. The ON and OFF times determine the ON and OFF intervals. The outputs from the oscillators OSC2 to OSC4, and the output pulses from the oscillator OSC1 are gated in the AND circuit. As a result of this, the output signal at the output terminal OUT undergoes such changes as depicted in FIG. 9 during arc or short. Upon removal of the arc or short, the output from the short detector circuit SD becomes "0" and the AND circuit AND is opened by the output from the inverter INV, permitting the output from the oscillator OSC1 to be passed as it is at the output terminal OUT.

The above embodiment varies both of the ON and the OFF intervals but a modification for changing the ON or OFF intervals only can also be achieved by substantially the same arrangement as described above. Moreover, an oscillator of the type that changes the ON time and the OFF time of its output in accordance with an input voltage is commercially available as an IC; accordingly, the oscillators OSC2 to OSC4 can be substituted with such an oscillator by applying thereto the output from the short detector circuit SD in FIG. 8 after integrating it. It is also possible to control the ON and OFF intervals by providing, instead of the oscillators OSC2 to OSC4, an ON time counter and an OFF time counter for counting external clock pulses and changing their count values by a data select circuit in accordance with the output signals from the timers TM1 to TM3.

As has been described in the foregoing, according to the present invention, when an arc or short is detected, the ON and OFF intervals are added to the drive pulse signal of a predetermined period which is applied to the switching element for turning the power source for electric discharge machining ON and OFF the ratio of the OFF intervals to the ON intervals being gradually increased with the lapse of time, so that a high intensity arc can also be removed at an early stage, providing for enhanced cutting efficiency. Accordingly, the present invention is of great utility when employed in an ordinary electric discharge machine or wirecut, electric discharge machine.

It will be apparent that many modifications and variations may be effected without departing from the scope of the novel concepts of this invention.

What is claimed is:

1. A power source arrangement for electric discharge machining, in which a power source and a switching element are connected in series to an elongated electrode and a workpiece electrode separated from the elongated electrode by a gap and the switching element is driven by a pulse signal to perform electric discharge machining of the workpiece, comprising:

detector means for comparing a reference voltage and the gap voltage in the gap between the electrode and the workpiece to generate a detector signal when arcs and shorts form in the gap between the electrode and the workpiece;

oscillator means for continuously producing a pulse signal having a predetermined period;

pulse signal generator means responsive to the detector signal for generating an additional pulse signal having ON and OFF intervals, the ratio of the OFF interval to the ON interval of the additional pulse signal gradually increasing with the lapse of time, said pulse signal generator means including first means responsive to the detector means for generating a first digital signal for a first predetermined period of time following the detection of an arc or short, a second gate having a first input responsive to the first means and a second input, and means connected between the output of the detector means and the second input of the second gate for allowing the pulse signal of predetermined period to pass through the first gate when the detector means detects neither an arc nor a short; and gate means responsive to the additional pulse signal and to the pulse signal of a predetermined period for driving the switching element until the arc or short is removed following the detection of its occurrence by the detector means, said gate means including a first gate having a first input for receiving the additional pulse signal and a second input for receiving the pulse signal of predetermined period, the output of the first gate driving the switching element;

wherein the first means comprises a first timer connected to the detector and a first oscillator connected to the first timer, wherein the second gate comprises an OR gate, and wherein the means connected between the detector means and the second input of the second gate comprises an inverter.

2. A power source arrangement for electric discharge machining, in which a power source and a switching element are connected in series to an elongated electrode and a workpiece electrode separated from the elongated electrode by a gap and the switching element is driven by a pulse signal to perform electric discharge machining of the workpiece, comprising:

detector means for comparing a reference voltage and the gap voltage in the gap between the electrode and the workpiece to generate a detector signal when arcs and shorts form in the gap between the electrode and the workpiece;

oscillator means for continuously producing a pulse signal having a predetermined period;

pulse signal generator means responsive to the detector signal for generating an additional pulse signal having ON and OFF intervals, the ratio of the OFF interval to the ON interval of the additional pulse signal gradually increasing with the lapse of time, said pulse signal generator means including first means responsive to the detector means for generating a first digital signal for a first predetermined period of time following the detection of an arc or short, a second gate having a first input responsive to the first means and a second input, and means connected between the output of the detector means and the second input of the second gate for allowing the pulse signal of predetermined period to pass through the first gate when the detector means detects neither an arc nor a short; and gate means responsive to the additional pulse signal and to the pulse signal of a predetermined period for driving the switching element until the arc or short is removed following the detection of its occurrence by the detector means, said gate means including a first gate having a first input for receiving the additional pulse signal and a second input for receiving the pulse signal of predetermined period, the output of the first gate driving the switching element;

wherein the pulse signal generator means additionally comprises second means for generating a second digital signal for a second predetermined period of time following the expiration of the first period of time, the ratio of the OFF interval to the ON interval of the second digital signal being greater than the ratio of the OFF interval to the ON interval of the first digital signal, wherein the second gate has a third input responsive to the second means, and wherein the second means comprises a second timer connected to the detector and a second oscillator connected to the second timer.

3. A power source arrangement for electric discharge machining, in which a power source and a switching element are connected in series to an elongated electrode and a workpiece electrode separated from the elongated electrode by a gap and the switching element is driven by a pulse signal to perform electric discharge machining of the workpiece, comprising:

detector means for comparing a reference voltage and the gap voltage in the gap between the electrode and the workpiece to generate a detector signal when arcs and shorts form in the gap between the electrode and the workpiece;

oscillator means for continuously producing a pulse signal having a predetermined period;

pulse signal generator means responsive to the detector signal for generating an additional pulse signal having ON and OFF intervals, the ratio of the OFF interval to the ON interval of the additional pulse signal gradually increasing with the lapse of time, said pulse signal generator means including first digital signal for a first predetermined period of time following the detection of an arc or short, a second gate having a first input responsive to the first means and a second input, and means connected between the output of the detector means and the second input of the second gate for allowing the pulse signal of predetermined period to pass through the first gate when the detector means detects neither an arc nor a short; and gate means responsive to the additional pulse signal and to the pulse signal of a predetermined period for driving the switching element until the arc or short is removed following the detection of its occurrence by the detector means, said gate means including a first gate having a first input for receiving the additional pulse signal and a second input for receiving the pulse signal of predetermined period, the output of the first gate driving the switching element;

wherein the pulse signal generator means additionally comprises second means for generating a second digital signal for a second predetermined period of time following the expiration of the first period of time, the ratio of the OFF interval to the ON interval of the second digital signal being greater than the ratio of the OFF interval to the ON interval of the first digital signal, wherein the second gate has a third input responsive to the second means, wherein the pulse signal generator means additionally comprises third means for generating a third digital signal for a third predetermined period of time following the expiration of the second period of time, the ratio of the OFF interval to the ON interval of the third digital signal being greater than the ratio of the OFF interval to the ON interval of the second digital signal, and wherein the second gate has a third input responsive to the third means.

4. The arrangement of claim 3, wherein the third means comprises a third timer connected to the detector and a third oscillator connected to the third timer.

* * * * *

UNITED STATES PATENT AND TRADEMARK OFFICE
CERTIFICATE OF CORRECTION

PATENT NO. : 4,431,895

DATED : February 14, 1984

INVENTOR(S) : Haruki Ohara

It is certified that error appears in the above-identified patent and that said Letters Patent is hereby corrected as shown below:

| | | |
|---|---|---|
| Column 1, | line 19, | "work" should be --workpiece--; |
| | line 32, | "on and off" should be --ON and OFF--. |
| Column 2, | line 3, | after "which" insert --gradually--; |
| | line 14, | after "1C" insert --are--. |
| Column 3, | line 2, | "iis" should be --is--; |
| | line 32, | after "pulse" insert --,--. |
| Column 4, | line 9, | delete "alone"; |
| | line 14, | delete "interval"; |
| | line 31, | "impared" should be --impaired--; |
| | line 39, | after "reference" insert --characters--; |
| | line 52, | delete "a". |
| Column 5, | line 17, | after "during" insert --an--. |

Signed and Sealed this

Twenty-fourth Day of July 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,431,895

DATED : February 14, 1984

INVENTOR(S) : Haruki Ohara

It is certified that error appears in the above-identified patent and that said Letters Patent is hereby corrected as shown below:

Column 1, line 19, "work" should be --workpiece--;
line 32, "on and off" should be --ON and OFF--.
Column 2, line 3, after "which" insert --gradually--;
line 14, after "1C" insert --are--.
Column 3, line 2, "iis" should be --is--;
line 32, after "pulse" insert --,--.
Column 4, line 9, delete "alone";
line 14, delete "interval";(first occurrence)
line 31, "impared" should be --impaired--;
line 39, after "reference" insert --characters--;
line 52, delete "a".
Column 5, line 17, after "during" insert --an--.

This certificate supersedes certificate of correction issued July 24, 1984.

Signed and Sealed this

Twenty-second Day of October 1985

[SEAL]

Attest:

Attesting Officer

DONALD J. QUIGG

Commissioner of Patents and Trademarks—Designate